(12) United States Patent
Fronk

(10) Patent No.: US 6,576,359 B2
(45) Date of Patent: Jun. 10, 2003

(54) CONTROLLED AIR INJECTION FOR A FUEL CELL SYSTEM

(75) Inventor: Matthew H. Fronk, Honeoye Falls, NY (US)

(73) Assignee: General Motors Corporation, Detroit, MI (US)

( * ) Notice: Subject to any disclaimer, the term of this patent is extended or adjusted under 35 U.S.C. 154(b) by 15 days.

(21) Appl. No.: 09/990,728

(22) Filed: Nov. 14, 2001

(65) Prior Publication Data

US 2002/0048698 A1 Apr. 25, 2002

Related U.S. Application Data

(62) Division of application No. 09/419,396, filed on Oct. 15, 1999.

(51) Int. Cl.[7] .......................... H01M 8/00; C10K 1/34; C10K 1/00
(52) U.S. Cl. .............................. 429/13; 429/12; 429/19; 429/22; 429/23; 423/246; 423/247
(58) Field of Search ................ 429/13, 12, 19, 429/22, 23; 423/247, 246

(56) References Cited

U.S. PATENT DOCUMENTS

| 4,458,650 A | | 7/1984 | Kessler et al. |
|---|---|---|---|
| 4,904,548 A | | 2/1990 | Tajima |
| 5,271,916 A | * | 12/1993 | Vanderborgh et al. ...... 423/246 |
| 5,272,017 A | | 12/1993 | Swathirajan et al. |
| 5,518,705 A | | 5/1996 | Buswell et al. |
| 5,637,415 A | * | 6/1997 | Meltser et al. ................. 429/17 |
| 5,763,113 A | | 6/1998 | Meltser et al. |

FOREIGN PATENT DOCUMENTS

| EP | 0911 629 A1 | 4/1999 |
|---|---|---|
| JP | 401089155 A | 4/1989 |
| JP | 401239772 A | 9/1989 |
| JP | 404115467 A | 4/1992 |
| JP | 406223850 A | 8/1994 |

OTHER PUBLICATIONS

Product Brochure–Sierra Instruments, Inc. entitled "Process Gas Mass Flow Controllers and Meters, Sierra's Side–Trak(TM), Series 840 and 830."

Delphi Product Brochure entitled "Injectors—Throttle Body Injection (TBI) Multec Bottom Feed," Flint, Michigan.

* cited by examiner

Primary Examiner—Patrick Ryan
Assistant Examiner—Angela J Martin
(74) Attorney, Agent, or Firm—Karl F. Barr, Jr.; Cary W. Brooks; Linda M. Deschere

(57) ABSTRACT

A method and apparatus for injecting oxygen into a fuel cell reformate stream to reduce the level of carbon monoxide while preserving the level of hydrogen in a fuel cell system.

6 Claims, 2 Drawing Sheets

CONTROLLED AIR INJECTION FOR A FUEL CELL SYSTEM

GOVERNMENT SUPPORT

The Government of the United States of America has right in this invention pursuant to Agreement No. DE-AC02-90CH10435 awarded by the U.S. Department of Energy.

FIELD OF THE INVENTION

This invention relates to a fuel cell system and more particularly to a system having a plurality of cells which consume an $H_2$-rich gas to produce power for vehicle propulsion.

BACKGROUND OF THE INVENTION

Fuel cells have been used as a power source in many applications. For example, fuel cells have been proposed for use in electrical vehicular power plants to replace internal combustion engines. In proton exchange membrane (PEM) type fuel cells, hydrogen is supplied to the anode of the fuel cell and oxygen is supplied as the oxidant to the cathode. PEM fuel cells include a membrane electrode assembly (MEA) comprising a thin, proton transmissive, non-electrically conductive solid polymer electrolyte membrane having the anode catalyst on one of its faces and the cathode catalyst on the opposite face. The MEA is sandwiched between a pair of electrically conductive elements which (1) serve as current collectors for the anode and cathode, and (2) contain appropriate channels and/or openings therein for distributing the fuel cells gaseous reactants over the surfaces of the respective anode and cathode catalysts. A plurality of individual cells are commonly bundled together to form a PEM fuel cell stack. The term fuel cell is typically used to refer to either a single cell or a plurality of cells (stack) depending on the context. A group of cells with the stack is referred to as a cluster. Typical arrangements of multiple cells in a stack are described in U.S. Pat. No. 5,763,113, assigned to General Motors Corporation.

In PEM fuel cells hydrogen ($H_2$) is the anode reactant (i.e., fuel) and oxygen is the cathode reactant (i.e., oxidant). The oxygen can be either a pure form ($O_2$), or air (a mixture of $O_2$ and $N_2$). The solid polymer electrolytes are typically made from ion exchange resins such as perfluoronated sulfonic acid. The anode/cathode typically comprises finely divided catalytic particles, which are often supported on carbon particles, and admixed with a proton conductive resin. The catalytic particles are typically costly precious metal particles. These membrane electrode assemblies are relatively expensive to manufacture and require certain conditions, including proper water management and humidification, and control of catalyst fouling constituents such as carbon monoxide (CO), for effective operation.

For vehicular applications, it is desirable to use a liquid fuel such as an alcohol (e.g., methanol or ethanol), or hydrocarbons (e.g., gasoline) as the source of hydrogen for the fuel cell. Such liquid fuels for the vehicle are easy to store onboard and there is a nationwide infrastructure for supplying liquid fuels. However, such fuels must be dissociated to release the hydrogen content thereof for fueling the fuel cell. The dissociation reaction is accomplished within a chemical fuel processor or reformer. The fuel processor contains one or more reactors wherein the fuel reacts with steam and sometimes air, to yield a reformate gas comprising primarily hydrogen and carbon dioxide. For example, in the steam methanol reformation process, methanol and water (as steam) are ideally reacted to generate hydrogen and carbon dioxide. In reality, carbon monoxide and water are also produced. In a gasoline reformation process, steam, air and gasoline are reacted in a fuel processor which contains two sections. One is primarily a partial oxidation reactor (POX) and the other is primarily a steam reformer (SR). The fuel processor produces hydrogen, carbon dioxide, carbon monoxide and water. Downstream reactors such as a water/gas shift (WGS) and preferential oxidizer (PROX) reactors are used to produce carbon dioxide ($CO_2$) from carbon monoxide (CO) using oxygen from air as an oxidant. Here, control of air feed is important to selectively oxidize CO to $CO_2$.

Fuel cell systems which process a hydrocarbon fuel to produce a hydrogen-rich reformate for consumption by PEM fuel cells are known and are described in co-pending U.S. patent application Ser. Nos. 08/975,442 and 08/980,087, filed in November, 1997, and U.S. Ser. No. 09/187,125, filed in November, 1998, and each assigned to General Motors Corporation, assignee of the present invention; and in International Application Publication Number WO 98/08771, published Mar. 5, 1998. A typical PEM fuel cell and its membrane electrode assembly (MEA) are described in U.S. Pat. Nos. 5,272,017 and 5,316,871, issued respectively Dec. 21, 1993 and May 31, 1994, and assigned to General Motors Corporation.

Efficient operation of a fuel cell system depends on the ability to effectively control the amount of oxygen provided to the reactors and to the fuel cell stack while maintaining the level of hydrogen supplied to the anode in the fuel cell stack. This is particularly difficult during transient operation of a vehicular fuel cell system wherein the reformate fuel requirements vary with the changing loads placed on the fuel cell.

Therefore, it is desirable to provide a method and apparatus by which a controlled amount of oxygen is supplied as a reactant to catalyze the oxidation of carbon monoxide while maintaining a high level of hydrogen in the anode fuel stream particularly during dynamic system operation.

SUMMARY OF THE INVENTION

The present invention is directed toward a method and apparatus for controllably supplying oxygen to promote the oxidation of carbon monoxide while avoiding excessive oxidation of hydrogen in a fuel cell reformate stream.

The fuel cell system of the present invention comprises a source of a reformate stream which contains hydrogen and carbon monoxide (CO). The reformate stream typically contains more hydrogen on a volume basis than CO. The fuel cell system further comprises a PROX reactor for selectively oxidizing the CO through contact of the stream with a catalyst inside the PROX reactor chamber. The catalyst is supported by a carrier within the chamber and the chamber includes an inlet and an outlet allowing the stream to pass through the reactor chamber and over the catalyst.

The fuel cell system further comprises an injector system which includes at least one electrically energized injector for supplying controlled pulses of a gaseous mixture containing oxygen, or preferably air, into the stream containing hydrogen and CO at a predetermined location or locations along the stream. In one location, the injector is placed downstream from the reformate source, but upstream from the PROX reactor. Alternate or complimentary locations are directly into the PROX reactor or downstream of the PROX reactor. The injector is electrically energized by a control unit which may also establish and regulate the duration of each pulse; and also regulate the frequency or time between the pulses wherein no oxygen is added to the stream.

The precise supply of an oxygen mixture in controlled pulses by the injector system advantageously provides a sufficient amount of oxygen to promote oxidation and thereby consumption of CO with minimal or lesser oxidation and consumption of hydrogen in the stream which is essential for efficient operation of the fuel cell and system. The advantageous result is a CO depleted reformate stream with high levels of hydrogen feeding the anode in the fuel cell. The fuel cell system further comprises one or more fuel cells downstream of the PROX reactor which receives and consumes the hydrogen-rich, CO depleted reformate stream to produce electrical energy.

The injection system of the present invention may also comprise a similar second injector between the PROX reactor and the fuel cell which functions to promote oxidation of remaining unreacted CO in the stream prior to the stream entering the anode inlet in the fuel cell. Thereby, the CO content of the stream is further reduced.

The present invention may also comprise devices for monitoring the amount of hydrogen in the reformate stream upstream and downstream of the reactor. A control unit may receive signals from the monitoring devices and compare the respective amounts of hydrogen upstream and downstream of the reactor. Based on the input, the control unit would adjust the pulses by the injector to reduce the level of CO while minimizing excessive consumption of hydrogen in the reformate stream.

The present invention may also comprise a device for monitoring the amount of CO in the stream downstream of the reactor. A control unit may receive a signal from the CO monitoring device and similarly adjust the pulses by the injector to maintain the desired levels of CO and hydrogen in the reformate stream. Thus, the invention enhances oxidation of CO to $CO_2$, while minimizing excessive oxidation of $H_2$ to $H_2O$.

Advantageously, the present method and apparatus is adaptable to, and easily implemented in, existing fuel cell systems which comprise a fuel processor, preferential oxidizer (PROX) and stack of fuel cells. The present method can be implemented in existing process controllers. In addition, the present monitoring method and apparatus is useable within a variety of fuel cell system configurations.

BRIEF DESCRIPTION OF THE DRAWINGS

The various features, advantages and other uses of the present invention will become more apparent by referring to the following description and drawings in which.

DETAILED DESCRIPTION OF THE PREFERRED EMBODIMENTS

Figure 1:
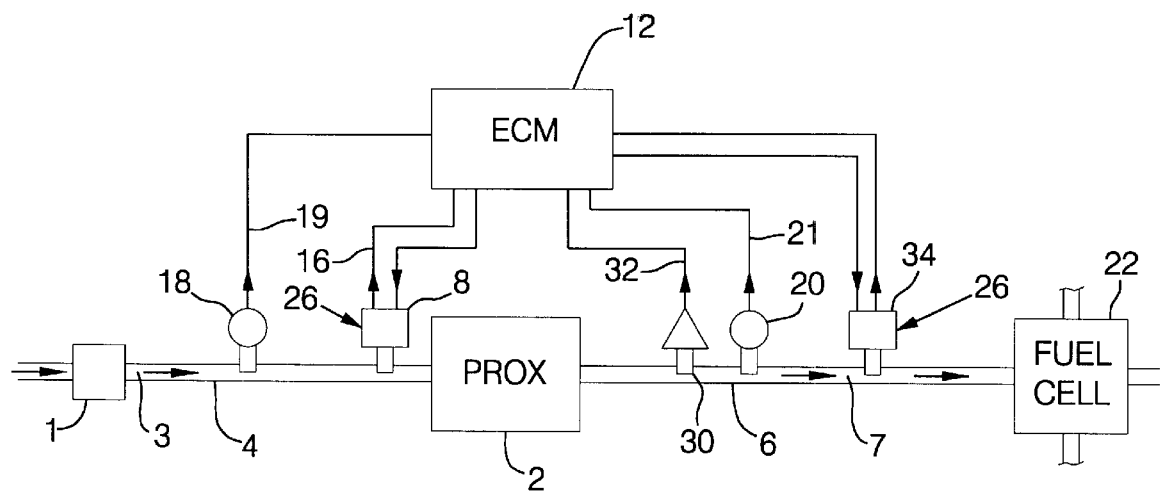
FIG. 1 is a schematic representation of the method and apparatus for controlled injection of an oxygen mixture for the fuel cell system of the present invention.

Referring generally to FIG. 1, the method and apparatus of the present invention is shown. The oxygen supply method and apparatus of the invention is usable to treat a carbon monoxide (CO) contaminate in an $H_2$-rich stream or reformate 3, regardless of the method by which such stream was obtained. The stream 3 may be obtained from methanol, or other hydrocarbons, for example, an alkene $C_nH_{2n+2}$, or other aliphatic or aromatic hydrocarbons. The source reformate stream 3 exiting the fuel processor or reformer 1 contains CO (i.e., about 1–3 mole %) and is rich with hydrogen ($H_2$). Due to the undesirable nature of CO and its contaminating effects on the anode in the fuel cell 22, the CO must be removed or reduced to very low nontoxic concentrations (i.e., less than about 20 ppm). The source reformate stream 3 exiting the fuel processor or reformer 1 may undergo several steps which may include prior partial oxidation in a partial oxidation reactor (POX)(not shown), reaction with steam, and one or more water/gas shift steps (not shown) to obtain the CO-contaminated, $H_2$-rich source stream 3 to be treated with oxygen in the preferential oxidizer reactor (PROX)2.

By way of further explanation, it is known that the carbon monoxide (CO) level of the reformate can be reduced by utilizing a water-gas shift reaction also referred to as WGS or shift. In the shift reactor, water (i.e. steam) is added to the reformate/effluent exiting the reformer, in the presence of a suitable catalyst, to lower its temperature, and increase the steam to carbon ratio therein. The higher steam to carbon ratio serves to lower the CO content of the reformate according to the following ideal shift reaction: $CO+H_2O \rightarrow CO_2+H_2$. The shift reaction is problematic in that some CO still survives the shift reaction. Depending upon the reformate flow rate and the steam injection rate, the CO content of the gas exiting the shift reactor can be as low as 0.5 mole %. Any residual hydrocarbon is converted to CO and hydrogen in the shift reactor. Hence, shift reactor effluent comprises hydrogen, carbon dioxide, water and some carbon monoxide.

The shift reaction is also problematic as it is not adequate to reduce the CO content of the reformate enough to avoid contamination of the anode in the fuel cell. Therefore, it is necessary to further remove carbon monoxide from the hydrogen-rich reformate stream to provide a suitable feed stream for the fuel cell. In order to further reduce the CO content of $H_2$-rich reformate exiting the shift reactor, the "PROX" (preferential oxidation reaction) is conducted in a suitable PROX reactor. The PROX reactor generally comprises a catalyst bed operated at temperatures which promote the preferential oxidation of the CO by air in the presence of the $H_2O$ but without consuming/oxidizing substantial quantities of the $H_2$. The PROX reaction is: $CO+1/2O_2 \rightarrow CO_2$.

Often, the $O_2$ required for the PROX reaction will be about 2 times the stoichiometric amount required to react the CO in the reformate. If the amount of $O_2$ is excessive, then excessive consumption of $H_2$ results. On the other hand, if the amount of $O_2$ is not more than the stoichiometric amount needed, insufficient CO oxidation will occur. The PROX process is described in a paper entitled, "Methanol Fuel Processing For Low Temperature Fuel Cells" published in the Program and Abstracts of the 1988 Fuel Cell Seminar, Oct. 23–26, 1988, Long Beach, Calif., and in U.S. Pat. No. 5,271,916 to Vanderbourgh, et al and U.S. Pat. No. 5,637, 415 to Meltzer et al, inter alia. U.S. Pat. Nos. 5,271,916; 5,637,415; and 5,316,871 are each incorporated herein by reference in their entirety.

PROX reactors 2 may be either (1) adiabatic, (i.e., where the temperature of the catalyst is allowed to rise during oxidation of the CO), or (2) isothermal (i.e., where the temperature of the catalyst is maintained substantially constant during oxidation of the CO). The adiabatic PROX process typically includes a number of sequential stages which progressively reduce the CO content. Temperature control is important in adiabatic systems, because if the temperature rises too much, a reverse water-gas shift reaction (RWGS) can occur which typically produces more CO. The preferred isothermal reactor, generally shown in FIG. 2, can produce the same CO reduction as the adiabatic process, but in fewer stages (e.g., one or two stages) and without concern for the reverse shift reaction. In either case (i.e., adiabatic or isothermal), a controlled amount of $O_2$, preferably as air, is mixed with the reformate 3 exiting the optional shift reactor (not shown), and the mixture is subsequently passed through a suitable PROX reactor 2, described in detail below.

Figure 2:
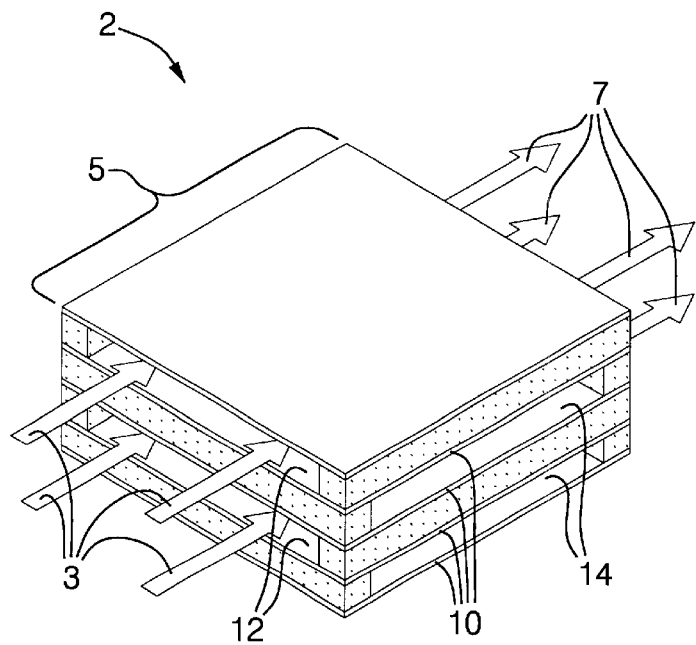
FIG. 2 is a partial perspective view of the preferred oxidation reaction reactor.

FIGS. 1 and 2 depict a preferred single-stage, isothermal PROX reactor 2 having an inlet conduit 4 conveying CO-contaminated, $H_2$-rich reformate stream 3 to the reactor 2 and an outlet conduit 6 for exhausting CO-lean, $H_2$-rich stream 7 from the reactor 2. For purposes of illustrating the present invention, the PROX reactor 2 is shown as simply a single-stage reactor. However, it is to be understood that the following description is equally applicable to each of several stages in a multi-stage reactor (not shown).

According to the present invention, the CO-contaminated, $H_2$-rich reformate stream 3 entering the PROX reactor 2 is mixed with a gas mixture containing oxygen that is injected into the stream 3 preferably ahead of the PROX reactor 2. Supply of the oxygen is accomplished by an injector 8. Reformate stream 7 exits the PROX reactor 2 having a significantly lower carbon monoxide content. Injector 8 is a pulsed gas injector which is described in detail below. Although the invention has been described as supplying a gaseous mixture containing oxygen, the gaseous mixture is preferably air and for purposes of simplicity only, will be referred to as air throughout the remaining disclosure.

As shown in FIG. 2, the PROX reactor 2 is preferably a single stage, isothermal reactor having an inlet 4 supplying reformate 3 and an outlet 6 having the CO-lean reformate 7 exiting therefrom. The PROX reactor 2 is designed to facilitate both selective oxidation of CO in the presence of a metal catalyst and to maintain the PROX reaction chamber 5 at a temperature in a desired range. The PROX reactor 2 includes carrier member substrates 10. Carrier substrates 10 each have a first surface 12 carrying the catalytically active metal, and a second surface 14 opposite the first surface for heat transfer to a cooling medium. By this arrangement, the exothermic heat of the CO oxidation reaction is removed, thereby maintaining the catalyst at a desired temperature or range of temperatures. Therefore, in this embodiment, the PROX reactor 2 also functions as a heat exchanger.

Figure 3:
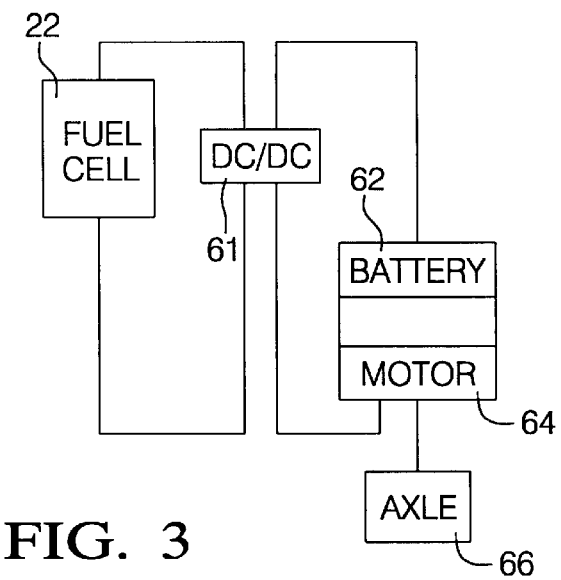
FIG. 3 is a partial pictorial view of a fuel cell in an exemplary application.

Referring now to FIG. 1, the fuel cell 22 is constructed and arranged to consume hydrogen-rich stream 7 having the reduced volumetric content of CO and thereby producing electrical energy. Referring generally now to FIG. 3, the electrical energy provided by the fuel cell 22 is ultimately converted to mechanical energy for vehicle propulsion. In this application, the system comprises the fuel cell 22 and an electric motor 64 constructed and arranged to accept electric energy from the fuel cell 22 and to convert the electric energy to mechanical energy produced by the electric motor 64. A battery 62 is arranged to accept and store electric energy supplied by the fuel cell 22 through a DC/DC converter 61 coupled to cell 22 and to provide electric energy to the motor 64. Finally, the driving axle 66 is constructed and arranged to rotate wheels of a vehicle when the axle is coupled to the electric motor. The method of the invention provides a relatively compact PROX reactor 2 and injector system for effective oxidation of carbon monoxide in real time to support the variable energy needs of the electric motor 64.

Referring back to FIG. 1, in a dynamic fuel cell system, the flow rate of the reformate stream 3 varies with the load demands put upon the fuel cell system. The concentration of the CO in the reformate 3 varies with the flow rate of the reformate if for no other reason than the reaction residence time in the reformer 1 and optional shift reactor varies. In order to optimize CO consumption in the PROX reaction while minimizing $H_2$ consumption, it is essential that the amount of oxygen mixed with the reformate 3 varies on a real time basis as the CO concentration of the reformate 3 varies.

In order to minimize CO content and maximize hydrogen content of the reformate gas stream 3, the strategy is to preferentially oxide CO rather than oxidizing hydrogen. Thus, it is desired that in the PROX reactor 2 the hydrogen content of the reformate stream 3 is maintained substantially the same in the PROX inlet conduit 4 as in the PROX outlet conduit 6. The same concept applies in the case of reformate gas stream 7 entering the anode inlet of fuel cell 22. In an alternative embodiment, a quantity of an air is supplied by a second injector 34 in PROX outlet conduit 6 downstream of the PROX reactor 2 and before the anode inlet of the fuel cell 22. This second injection of oxygen, preferably air, preferentially oxidizes any remaining carbon monoxide in the reformate gas 7.

It is very difficult to preferentially oxidize CO, and precise control of the amount of oxygen used to accomplish this is a key factor. When all of the CO is consumed, the oxygen will react and very rapidly consume hydrogen such that there is potentially a significant difference between the concentration of hydrogen in the reformate 3 entering the PROX reactor 2 compared to the hydrogen concentration in gas stream 7 exiting the PROX reactor 2. This is undesirable. This same consideration applies to the quantity of hydrogen in the reformate stream 7 upstream and downstream of a second injector 34 between the outlet of PROX 2 and the anode inlet of fuel cell 22.

Referring now to FIG. 1, in accordance with the present invention, controlled injection of air into the reformate 3 through inlet conduit 4 upstream of PROX reactor 2 is accomplished by an electrically energized air injector 8. The operation of the electrically energized air injector 8 is controlled by a control unit which energizes the injector to establish the duration of pulses of air provided by the injector 8 to the reformate 3 as well as the interval between the pulses of air wherein no oxygen is supplied to the stream 3. Such energization and control of the injector 8 is preferably accomplished by an electronic control module (ECM) 12. Preferably, injector 8 provides air upstream of PROX reactor 2 as seen in FIG. 1. In an alternative aspect, injector 8 provides air directly into PROX reactor 2.

Determination of the quantity of air to be supplied by the injector 8 to the reformate 3 may be accomplished in a variety of ways. In one option, the flow rate of the reformate 3 to the PROX reactor 2 is monitored and the amount of air needed to be mixed with reformate 3 upstream of the PROX reactor 2 is determined by the ECM 12 which in turn provides a control signal 16 to injector 8. In order to provide more precise delivery of pulses of air through the injector 8 to the stream 3, hydrogen content and carbon monoxide content may be monitored by devices 18, 20 and/or 30 to assist in determining the duration of the pulse and the interval between air pulses by the injector 8. As used herein, the term content refers to the amount or proportion of a constituent, in accordance with its generally accepted definition. Concentration refers to the proportion of a constituent relative to other constituents.

In one option, the difference in hydrogen concentration between the inlet 4 and the outlet 6 of the PROX reactor 2 is monitored and used to determine the amount of air that is injected and mixed with the reformate 3 upstream of the PROX 2. In this option, a first hydrogen sensor 18 measures the hydrogen content in reformate stream 3 in the inlet conduit 4 and sends a corresponding signal, i.e., voltage 19 to the ECM 12. Similarly, a second hydrogen sensor 20 associated with the outlet conduit 6 measures the hydrogen content in the reformate 7 exiting the PROX 2 and sends a corresponding signal, i.e., voltage 21, to the ECM 12. In this arrangement, if it is determined that excessive amounts of hydrogen are being consumed in the PROX 2, it is presumed that excessive amounts of air are being provided through injector 8 and an appropriate adjustment (i.e., less air) is made by the ECM 12 through injector 8 by either decreasing the duration of the air pulse or increasing the interval between pulses, or both.

In another aspect, a carbon monoxide monitor 30 determines the CO content in PROX outlet 6 downstream of the PROX 2 and sends an appropriate signal 32 to the ECM 12. ECM 12 similarly makes the necessary adjustment to control the duration of air pulses and/or the interval between air pulses supplied to stream 3 by injector 8. It can be seen that there are several options whereby the ECM 12 may process one or more input signals and output a control signal to the injector 8 to affect the quantity of air delivered by injector 8. These adjustments may be through modulating the duration of air pulses, the interval between pulses, or both. This method and apparatus provides the precise amount of oxygen that is required to consume the CO in the inlet reformate stream 3 to the PROX reactor 2 without overcompensating and consuming an excessive amount of hydrogen. Methods for monitoring selected gaseous constituents (i.e., $H_2$ and CO) in mass, molar, or volume quantities and concentrations are known, and are described, for example, in U.S. Pat. No. 5,637,415 (Meltser et al.), and in U.S. Pat. No. 5,670,115 (Cheng et al.), each assigned to General Motors Corporation and incorporated herein by reference in their entirety.

In another embodiment, a second injector 34 is provided in conduit 6 as shown in FIG. 1. Injector 34 similarly provides controlled pulses of an oxygen mixture, preferably air, to the reformate stream 7 between the PROX 2 and the anode inlet of fuel cell 22. Injector 34 is an electrically energized air injector which functions in a manner essentially the same as that described with respect to injector 8. Injector 34 is controlled by a similar control unit which energizes the injector to establish the duration of the pulses of air, the interval between pulses of air, or both, to provide the precise amount of oxygen for reaction with at least a portion of any CO that remains in the reformate stream or effluent 7 from the PROX 2. Operation of injector 34 may be controlled by the ECM 12 or by a different controlling unit if so desired. Although the consumption of hydrogen is sought to be minimized, it may be desired to add humidity to the reformate stream depending on the nature of the fuel cell polymeric components. Therefore, air injection is controllable to achieve preferential consumption of CO along with formation of a very small amount of water, if required, for anode humidification.

Also as described, a carbon monoxide monitor 30 may be used in conjunction with ECM 12 to assist in regulating the amount of air supplied by injector 34, or other means such as hydrogen monitors 18 and 20 may be used in conjunction with a control unit such as ECM 12 to determine the optimum quantity of air to be injected.

The ECM 12 implements the process and contains the necessary hardware and software for receiving inputs, converting inputs to other values correlated with the inputs, summing inputs, generating internal signals based on those inputs, and conditioning the internal signals to provide a suitable output control signal. Therefore, the ECM 12 may process several input signals based on hydrogen content, carbon monoxide content, or both, for controlling the electrically energized air injectors 8 and 34 to modulate the injection of oxygen or air to the reformate streams 3 and 7 in a manner as described.

The method by which the ECM 12 determines the adjustment of pulses by injectors 8 and 34 may be by a variety of methods including look-up tables and mathematical relationships which determine the duration of pulses of air, the interval between pulses, and/or both. It is to be understood that the duration of pulses may vary from pulse to pulse and the interval between pulses may vary from pulse to pulse.

It is also to be understood that the invention applies to an injection stream which comprises oxygen, regardless of its nature. The invention as described herein discloses air as a preferred oxidant for the PROX reactor 2 and as an oxidant delivered to the reformate 7 between the PROX 2 and the anode inlet of fuel cell 22. However, it is to be understood that the invention discloses and equally applies to an injected oxidant which comprises essentially oxygen, or a gaseous mixture containing oxygen or an oxygen enriched stream.

More specifically, in a preferred aspect, the electrically energized injector 8 of the invention delivers air to the reformate stream 3 in a series of pulses. The flow is controlled by energizing the injector 8 at regular intervals and varying the duration of the air delivery pulses. When increased air delivery is desired, the injector 8 is energized for a longer period of time to increase the duration of the air delivery pulses. When decreased air delivery is desired, the injector 8 is energized for a shorter period of time to decrease the duration of the air delivery pulse. In an alternative, air injection is controlled by energizing the injector 8 at intermittent intervals and varying the interval between delivery of pulses. In this alternative, when increased air delivery is desired, the time between pulses is decreased. When decreased air delivery is desired, the time between pulses is increased. In still another alternative, both the time duration of the pulses and the interval between the pulses is varied for a series of pulses. Therefore, it is to be understood that the invention is not limited to merely varying pulse duration (pulse width modulation) but also encompasses the interval between pulses also referred to as inter-pulse spacing or inter-pulse time spacing. Although the option of changing pulse duration and interval between pulses is available, in its most practical adaptation, the quantity of air delivered is varied by operating the injector 8 to deliver pulses at regular intervals and varying the time duration of the pulses (i.e., pulse width modulation). These methods of control are equally applicable to injector 34.

A suitable electrically energized injector is supplied by Delphi Automotive Systems of Flint, Mich. and is designated a Throttle Body Injection (TBI) Multech Bottom Feed injector. The bottom feed injector is a very precise device which accurately meters a liquid or gaseous constituent. The bottom feed Multech injector is a solenoid operated valve that uses a spherical end armature along with a conical seat. Metering is controlled by a six-hole orifice just below the valve. The six streams merge to form a full, dispersed cone configuration. This injector is able to provide metering from −40° C. to 110° C. and is adaptable for a broad range of flow rates and pressures. Exemplary capacity flows are in a range of about 4 to about 8 grams per second, and more particularly 4.16 to 7.46 grams per second. Exemplary pressure range is 75 to 200 kPa. The injector is capable of +/−2.0% at 2.5 milliseconds and provides pulse width modulation within a 30 millisecond period of time. Drive circuit compatibility is typical. Its linear flow range at 70 kPa is 12.0:1 and at 200 kPa is 15.0:1. Advantageously, it is capable of a response time of as little as 31 milliseconds at 32 Hz frequency for a 10–90% flow change. Its granularity is approximately 0.1 grams per second and is of a small enough size to be included in an onboard fuel cell system. The injector as described above has an overall dimension of about 50 millimeters in length and a diameter extent of approximately 21 millimeters.

Given the wide capacity flow capability of the exemplary injector described above, it is evident that selection of the specific injector is based on typical design criteria. The air flow orifice area in the electrically energized injector 8 is selected to be large enough to deliver the maximum air flow required when the injector is continuously energized. Preferably, the air flow orifice area is selected to deliver the maximum quantity of air required for any pulse when the injector is energized for a period of time which is 90% of the pulse-to-pulse interval. That is, the maximum quantity of air is delivered when the injector is energized with a 90% duty cycle. Then, when a lesser quantity of air is required, the injector is energized with a proportionately lesser duty cycle. Thus, it will be appreciated that the orifice size establishes the duty cycle which will deliver the minimum quantity of air required for a pulse occurring during a low operating condition, such as during reduction of load on a fuel cell system. Advantageously, although the injector is capable of delivering the maximum quantity of air, at the same time this injector is also capable of supplying the minimum quantity of air required for any pulse within a minimum period of time required for a predictable and repeatable air pulse. Furthermore, the exemplary injector provides the advantage of exceptionally rapid pulse width modulation on the order of 30 milliseconds as described earlier.

Figure 4:
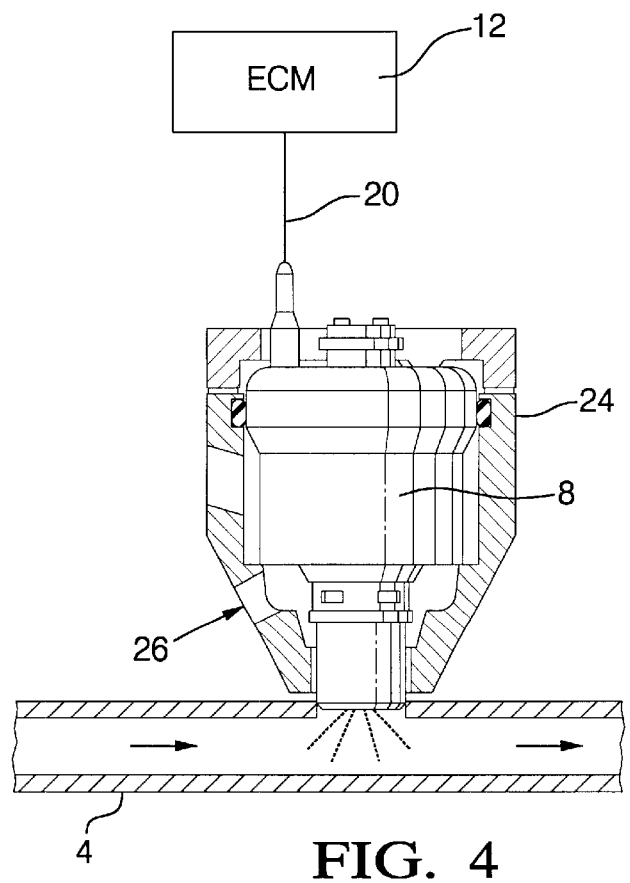
FIG. 4 is a cutaway elevational view of an injector according to the present invention.

As seen in FIGS. 1 and 4, the injector 8 is preferably mounted in an air chamber 24 through which the supply of air 26 is delivered under pressure to the injector 8 through, for example, a compressor (not shown). The injector 8 is energized within the air chamber 24 in a conventional manner by the ECM 12 to deliver air in timed pulses as desired from the chamber 24 preferably into the reformate stream 3. A similar arrangement is usable for the injector 34 used to inject air into the reformate stream 7 between the PROX reactor 2 and the anode inlet in fuel cell 22. It should be noted that an auxiliary pressure regulation system may be used to maintain a consistent gas pressure in chamber 24. Such optional regulation system is provided in fluid flow communication with chamber 24 through access port 28. Such regulation system is described in cooperation with an injection system in U.S. Pat. No. 4,458,650 (Kessler) assigned to General Motors Corporation and incorporated herein by reference in its entirety.

In summary, in the present application, the injector 8 is preferably energized at regular intervals for a period of time (pulse duration) which may be varied, that is, a pulse width modulation system. It will be appreciated that the frequency of injection is also variable to coincide with the frequency of events in the system (frequency modulation). Therefore, the injector system and its method of use are advantageously used to satisfy the need for tight control of air flow in a fuel cell system. The flexibly, quick response time, precise control and adaptability to varied conditions render the system for air injection well suited for fuel cell system use.

Advantageously, the invention provides a method and apparatus for precisely adding air to oxidize carbon monoxide while minimizing or avoiding excessive oxidation of hydrogen in a reformate stream to meet the variable demands in a fuel cell system.

While this invention has been described in terms of certain embodiments thereof, it is not intended that it be limited to the above description but rather only to the extent set forth in the following claims.

The embodiments of the invention in which an exclusive property or privilege is claimed, are defined in the following claims.

What is claimed is:

1. In a method of operating a hydrogen-oxygen fuel cell system comprising the principal steps of (1) providing a hydrogen-rich reformate gas having a first carbon monoxide content, and (2) subjecting said reformate gas to an oxidation reaction for oxidizing said carbon monoxide with oxygen in the presence of said hydrogen to produce a feed stream for said fuel cell which has a second carbon monoxide content less than said first content, the improvement comprising: generating a series of pulses of oxygen-containing gas and injecting said pulses into said reformate gas having said first carbon monoxide content, while varying at least one pulse feature selected from pulse duration and interval between pulses, to optimize consumption of said carbon monoxide from said fuel gas while minimizing consumption of hydrogen therefrom, to thereby produce said second carbon monoxide content less than said first content.

2. The method of claim 1, wherein said duration of said pulses is varied.

3. The method of claim 1 wherein said interval between said pulses is varied.

4. The method of claim 1 further comprising determining said second carbon monoxide content and changing said pulse duration proportional to said second content to optimize consumption of carbon monoxide in said reformate gas.

5. The method of claim 1 further comprising determining the hydrogen content in said feed stream and changing said pulse duration inversely with said hydrogen content to minimize consumption of hydrogen.

6. The method of claim 1 further comprising generating a second series of pulses of oxygen-containing gas and injecting said second series of pulses into said fuel cell feed stream while varying at least one pulse feature selected from pulse duration and interval between pulses, to oxidize at least a portion of any remaining carbon monoxide.

* * * * *